Patented Nov. 15, 1949

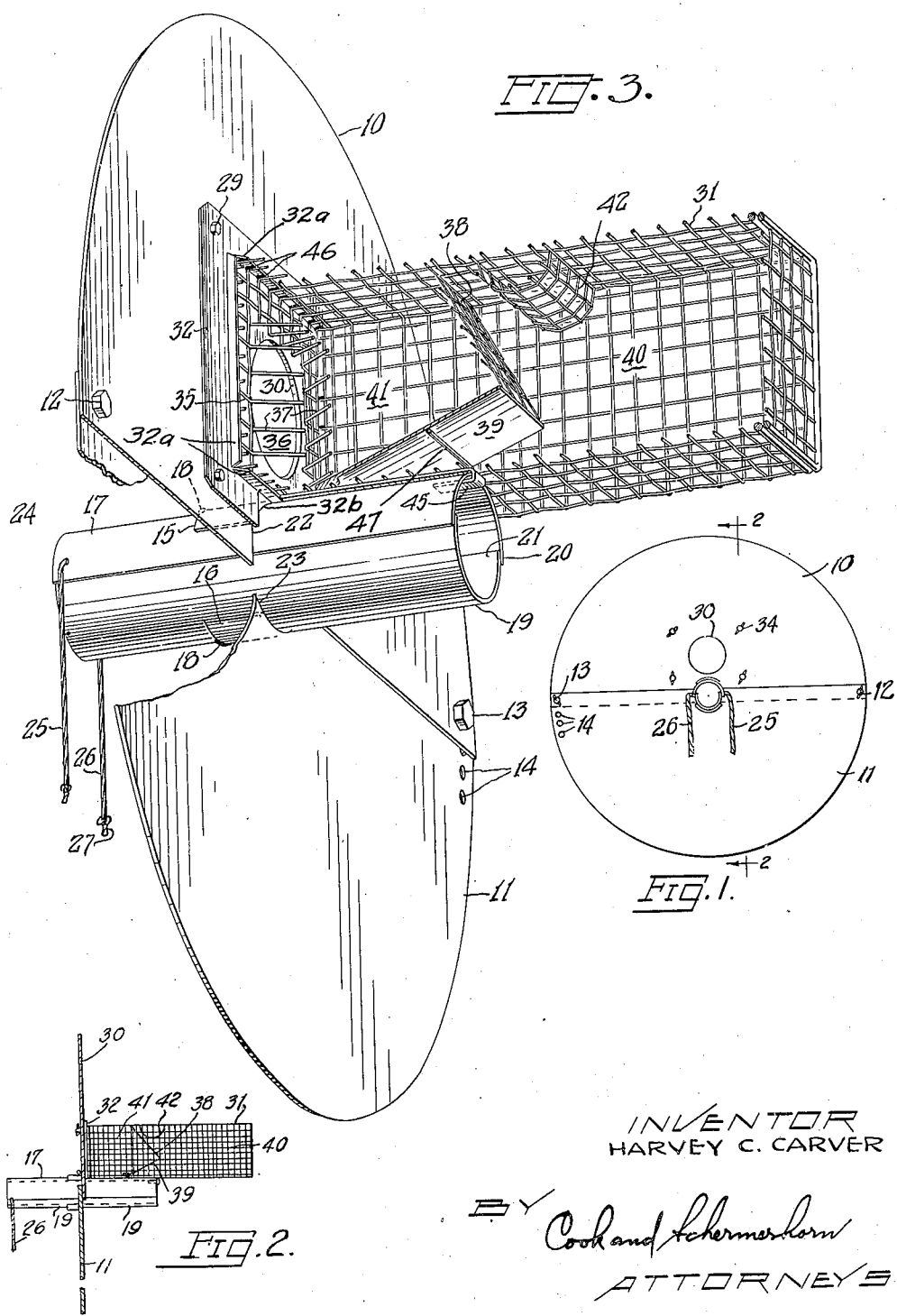

2,488,466

UNITED STATES PATENT OFFICE 2,488,466

RAT SHIELD TRAP

Harvey C. Carver, Portland, Oreg.

Application December 15, 1947, Serial No. 791,809

4 Claims. (Cl. 43—65)

This invention relates to a rat shield trap for use on ship hawsers and the like.

It is recognized that it is almost impossible to prevent rats from getting aboard ships in port. Conventional rat shields are effective to prevent rats from climbing the hawsers, but the rats, nevertheless, come aboard on unguarded gangplanks and in supplies and cargo. Ships docking at a port of entry are, therefore, always a potential hazard because of the likelihood of infected rats leaving the ship and spreading various diseases which they are known to carry from different parts of the world. When the rats come ashore they not only multiply and infest the port of entry, but they also proceed to travel to all parts of the country over the various arteries of commerce. A great many rats leave the ship and start ashore by way of the various hawser lines secured to the dock, proceeding down the hawsers until they encounter the conventional rat shields which they cannot pass. Such shields often tilt at a considerable angle from the perpendicular, lending a strong inducement for the rats to try to jump the shield. They may be observed, one after another, attempting to jump such a shield, and then, falling into the water, they swim freely ashore. Especially when the gang planks and cargo are carefully watched for rats, they try to leave the ship by the hawsers, and come ashore in every port in large numbers by swimming after falling from the rat shields. Hawser traps are not broadly new, but the types heretofore proposed have been complicated and expensive to manufacture and have not been adopted and put into general use.

The general object of the present invention is, therefore, to provide an improved trap to catch rats coming down a hawser and the like, so that they can neither get ashore nor return to the ship from whence they came. Other objects are to provide novel means for mounting a cage trap on a hawser rat shield and the like, so that the cage may be removed from the shield to exterminate any rats therein, to provide a disc-like shield which is adjustable to fit closely on hawsers of different sizes, to provide means to hold the shield perpendicular to the hawser, and to provide means to prevent the shield, with its trap, from rotating on the hawser.

The invention comprises, in general, a shield made in two sections and bolted together in adjusted relation to fit hawsers of different sizes. Each section of the shield carries a flexible sleeve portion which may be curved to fit closely around the hawser and be secured thereto to prevent movement of the shield on the hawser. These sleeve portions, together with their securing means, are thereby effective to hold the shield perpendicular to the hawser and to prevent it from rotating on the hawser. Means are provided for mounting a cage trap on one of the shield sections, and for engaging the cage with one of the sleeve portions to hold it rigid. The shield is provided with a hole at the entrance to the cage, so that rats attempting to proceed down the hawser will pass through the hole and enter the cage, from which they cannot escape. The cage may be removed from the shield for disposing of the rats without removing the shield from the hawser.

The invention will be better understood, and other objects and advantages will become apparent, from the following description with reference to the accompanying drawings illustrating a preferred embodiment of the invention. Various changes may be made in the construction and arrangement of parts, and all such modifications within the scope of the appended claims are included in the invention.

In the drawings:

Figure 1 is a front elevation view of a preferred form of construction embodying the principles of the invention;

Figure 2 is a sectional view, taken on the line 2—2 of Figure 1;

Figure 3 is an enlarged perspective view with the major portion of the cage shown in longitudinal section and parts of the shield broken away:

The shield comprises two semicircular sections 10 and 11 of sheet metal conected together at two opposite points by the bolts 12 and 13, preferably equipped with wing nuts which may be tightened sufficiently without the use of tools. When the two sections are bolted together as shown in Figure 1, they form a large circular shield several feet in diameter which may be placed upon a hawser and the like to interrupt the progress of rats or other rodents crawling along the hawser. When bolted together in the manner shown, the two sections 10 and 11 overlap sufficiently for the two bolts to secure the sections rigidly together, a series of holes 14 being provided in one section for one of the bolts so that the sections may be overlapped to a greater extent on one side in mounting on a small hawser or rope.

In the center of the shield, the section 10 has one or more tabs of metal turned up to form a flange 15, and the other section 11 has a similar tab turned up to form a flange 16. A semicylindrical sleeve portion 17 is rigidly secured in its central portion to the flange 15 by a weld 18 or other suitable means, and a semicylindrical sleeve portion or element 19 is similarly secured to the other flange 16. The sleeve portions 17 and 19 extend from several inches to a foot on either side of the respective shield sections 10 and 11, and are quite rigid in a longitudinal direction by reason of their transverse curvature, to maintain these shield sections perpendicular with the hawser 24 passing through the tubular sleeve formed by the two sleeve portions.

The semicylindrical sleeve portions 17 and 19 are preferably made of somewhat flexible sheet metal and attached to the flange elements 15 and 16 only in their central portions to leave the lateral edges 20 and 21 of the sleeve portions free and unattached to be bent to fit the hawser on which the shield is used. The sleeve portions 17 and 19 are of a width to fit the largest hawser which may be received within the opposed semicircular openings 22 and 23 cut out of each shield section. These openings provide the material for the tabs forming the flanges 15 and 16. Then, when the shield is applied to a smaller hawser or rope, the lateral edges 20 and 21 may be squeezed together to overlap, as shown in the drawings, to fit closely about the hawser. When the shield is applied to a small hawser and the edges 20 and 21 are to be overlapped in the manner described, the bolt 13 is placed in one of the holes 14 causing the shield sections 10 and 11 to overlap as far as possible to bring the flanges 15 and 16 and sleeve portions 17 and 19 rather snugly together upon opposite sides of the hawser. There will then be no gap around the hawser through which a rodent could pass. The long bearing of the sleeve portions 17 and 19 upon the hawser, their longitudinal rigidity, and their rigid attachment to the respective shield sections 10 and 11, hold the shield firmly in a position perpendicular to the hawser so that it cannot tilt to provide encouragement for the rodents to attempt to jump the shield.

A pair of small ropes 25 and 26 have end portions 27 attached to the outer corners of the sleeve portions 17 for securing the shield firmly to the hawser. By wrapping the ropes 25 and 26 around the hawser in opposite directions and securing the ends by clove hitches or half hitches, the shield is prevented from sliding down an inclined hawser, and it is also prevented from rotating thereon.

Adjacent the flange 15 the shield section 10 is provided with a trap opening 30 leading into a cage trap 31 mounted on the rear side of this shield section. The cage 31 is preferably formed of heavy gage weldable screen wire, or the like, having a rectangular flange plate 32 welded to one end of the cage. Holes 33 are provided in the flange plate 32 to register with holes 34 in the shield section 10 for receiving bolts 29 equipped with wing nuts to mount the cage securely on the shield section. The cage or trap has an end wall 35 with an opening 36 immediately behind the opening 30 in the shield, and a series of resilient inwardly directed pointed wires 37 surrounding the opening 36 so that the wires will spread apart to permit a rodent to enter the cage freely, but will spring back to prevent its withdrawal after it has inserted its head past the points. There is an angular partition 38 within the trap having a counterweighted trapdoor 39 pivotally mounted on a horizontal rod 41 to admit the rodent into an end compartment 40 and prevent its return to the compartment 41 between the partition 38 and end 35. A bait receptacle 42 is provided in the compartment 40 to induce the rodent to pass through the trapdoor 39 and leave the compartment 41. Suitable doors and latches, not shown, are provided for access to the bait compartment 42 and for removal of the rodents from the compartment 40. A hook 45 is formed on a strap welded to the bottom of the cage to engage over the end of sleeve portion 17 to brace the trap so that its weight with the rodents contained therein will rest upon the sleeve portion 17 and the hawser in addition to the support provided by the bolts 29 in the flange 32. The wrapping of the ropes 25 and 26 in opposite directions around the hawser prevents the shield with the loaded cage from swinging around under the hawser. By simply unscrewing the wing nuts from bolts 29 the cage may be easily removed from the shield without removing the latter from the hawser and the animals cannot escape from the cage when it is thus removed.

Further details of construction are shown in Figure 3. The flange plate 32 has perpendicular rearwardly extending flanges 32a on its four sides defining a rectangular opening to receive the cage 31. The four side walls of the cage fit snugly within the opening formed by the four flanges 32a and the cage wires are welded to these flanges as indicated at 46. The plate 32 thereby forms a mounting flange on the cage extending outwardly and laterally in the plane of its end wall 35. The central bottom portion of plate 32 is notched at 32b to clear the sleeve element 17 so that the bottom flange 32a and the bottom of the cage may rest on the sleeve in the manner shown.

The shield on which the trap is mounted may be turned in either direction on the hawser to catch rats leaving the ship or entering the ship, and the cage 31 may be mounted on either side of the shield section 10, either before or after the shield has been secured to the hawser. With the present device installed on a hawser to catch rats leaving the ship, there is little incentive for them to attempt to jump over the shield when the shield is held perpendicular to the rope, making it difficult to jump, and when it is further provided with an opening 30 which appears to the rodents to lead through to the hawser on the other side. In addition to preventing the rats from reaching the shore or reaching the ship, as the case may be, the present device performs a further very useful function by catching the rats alive so that they may be sent to a laboratory if desired.

It is obvious that the present rat shield trap may, with slight modification, be applied to supports for structures and various other members which rats or other rodents use as runways. All such uses to which the present device is adapted, and such modifications as are necessary to mount the device on such structures, within the scope of the appended claims, are included in the invention.

Having now described my invention and in what manner the same may be used, what I claim as new and desire to protect by Letters Patent is:

1. In a rat shield trap, a shield section having a hawser opening therein, a semicylindrical sleeve element secured to said shield section, said shield section having a trap opening adjacent said sleeve element, a cage trap having a mounting flange on one end detachably secured to said shield section behind said trap opening to rest on said sleeve element, and a hook on the bottom of said cage detachably engaging said sleeve element.

2. A rat shield trap for hawsers and the like comprising a shield having a hawser opening in its center, sleeve elements on said shield around said hawser opening to fit a hawser in said opening, means for securing said sleeve elements to a hawser, said shield having an opening adjacent said hawser opening, a cage trap having walls to confine a trapped animal, said cage having an end wall with an entrance opening, and a side wall, means for detachably securing said end wall to said shield with said entrance opening in register with said last mentioned shield opening, and means for detachably securing said side wall to one of said sleeve elements, whereby said cage may be removed from said shield with a trapped animal without removing the shield from its hawser.

3. A rat shield trap for hawsers and the like comprising a shield having a hawser opening, said shield having an animal opening adjacent said hawser opening, hawser sleeve elements on said shield around said hawser opening, a cage trap for confining a trapped animal, said trap having an end wall with an entrance opening, and a side wall, means for detachably securing said end wall to said shield with said entrance opening in register with said animal opening in the shield and with said side wall resting against one of said sleeve elements, and a hook on said side wall detachably engaging said sleeve element, whereby said cage may be removed from the shield with a trapped animal without removing the shield from its hawser.

4. A rat shield trap for hawsers and the like comprising a flat shield having a hawser opening, said shield having an animal opening above said hawser opening, hawser sleeve elements on said shield around said hawser opening to mount said shield on a hawser and hold it perpendicular thereto, a cage trap for confining a trapped animal, said trap having an end wall with a trap opening, and side walls, a flange plate on said cage extending outwardly beyond said side walls substantially in the plane of said end wall, and means for detachably securing said flange plate to said shield with said trap opening in register with said animal opening in said shield so that said cage may be removed from said shield with a trapped animal without removing the shield from its hawser.

HARVEY C. ×<sup>his</sup><sub>mark</sub> CARVER.

Witnesses to the mark of Harvey C. Carver:
OLIVER D. OLSON,
EUGENE M. ECKELMAN.

REFERENCES CITED

The following references are of record in the file of this patent:

UNITED STATES PATENTS

| Number | Name | Date |
| --- | --- | --- |
| 977,240 | Ward | Nov. 29, 1910 |
| 1,052,547 | Worthington | Feb. 11, 1913 |
| 1,160,634 | Maynard | Nov. 16, 1915 |
| 1,373,597 | Carey | Apr. 5, 1921 |
| 1,641,081 | Heymann | Aug. 30, 1927 |

FOREIGN PATENTS

| Number | Country | Date |
| --- | --- | --- |
| 441,360 | France | Aug. 5, 1912 |